United States Patent
Gauduin et al.

(10) Patent No.: US 9,712,684 B2
(45) Date of Patent: Jul. 18, 2017

(54) AUDIO SYSTEM FOR AN AIRCRAFT

(71) Applicant: AIRBUS OPERATIONS (S.A.S.), Toulouse (FR)

(72) Inventors: Benoit Gauduin, Toulouse (FR); Fabrice Cotdeloup, Plaisance du Touch (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 15/056,623

(22) Filed: Feb. 29, 2016

(65) Prior Publication Data

US 2016/0269565 A1     Sep. 15, 2016

(30) Foreign Application Priority Data

Mar. 10, 2015   (FR) .................................. 15 51971

(51) Int. Cl.
*H04M 1/00* (2006.01)
*H04M 11/08* (2006.01)
(Continued)

(52) U.S. Cl.
CPC ............. *H04M 11/08* (2013.01); *G06F 3/165* (2013.01); *G10L 19/167* (2013.01); *H04L 12/12* (2013.01); *H04M 11/02* (2013.01); *H04L 12/00* (2013.01)

(58) Field of Classification Search
CPC ..... H04M 11/00; H04B 1/38; H04B 7/18506; H04W 84/06; H04K 1/00; G08G 2/0021; B64D 7/00
(Continued)

(56) References Cited

U.S. PATENT DOCUMENTS 3,739,329 A * 6/1973 Lester .................. G08B 3/1083
                                                          340/8.1
3,999,015 A * 12/1976 Snyder .................. H04M 11/00
                                                          340/662
(Continued)

FOREIGN PATENT DOCUMENTS

JP       2006 203586 A    8/2006
WO      WO 96/19897 A1   6/1996

OTHER PUBLICATIONS

French Search Report for Application No. 1551971 dated Jan. 28, 2016.
(Continued)

*Primary Examiner* — Binh Tieu
(74) *Attorney, Agent, or Firm* — Jenkins, Wilson, Taylor & Hunt, P.A.

(57) ABSTRACT

An audio system for an aircraft of the type which includes radiocommunications units and a management unit to which are connected by cables, pieces of audio equipment. Each audio equipment piece includes a generator which, under control of the control unit, is configured to generate a pulsed coded audio signal and inject the signal into a same cable as that used for conveying the audio signals coming from the audio unit of the audio equipment, each code formed by a pulsed coded audio signal being representative of a piece of audio equipment. The audio system includes a decoder for receiving and decoding a coded audio signal generated by a piece of audio equipment and for generating a logic control signal to activate the radiocommunications unit which has previously been associated with the audio equipment represented by the code of the coded audio signal received and decoded.

10 Claims, 6 Drawing Sheets

(51) Int. Cl.
*H04M 11/02* (2006.01)
*G10L 19/16* (2013.01)
*G06F 3/16* (2006.01)
*H04L 12/12* (2006.01)
*H04L 12/00* (2006.01)

(58) Field of Classification Search
USPC ..... 379/156, 164, 165, 166, 167.01, 167.02, 379/267.13, 167.14, 167.15, 171, 172, 379/173, 160; 455/500, 509, 511, 515, 455/516
See application file for complete search history.

(56) References Cited

U.S. PATENT DOCUMENTS

| | | | | |
|---|---|---|---|---|
| 4,352,200 A | * | 9/1982 | Oxman | H04H 20/62 379/55.1 |
| 4,369,425 A | | 1/1983 | Andersen et al. | |
| 4,536,747 A | * | 8/1985 | Jensen | G08B 19/00 340/502 |
| 4,538,031 A | * | 8/1985 | Benning | H04M 11/00 379/102.06 |
| 4,774,514 A | | 9/1988 | Hildebrandt et al. | |
| 4,866,515 A | | 9/1989 | Tagawa et al. | |
| 4,866,704 A | | 9/1989 | Bergman | |
| 4,903,298 A | * | 2/1990 | Cline | H04K 1/00 380/270 |
| 4,958,381 A | | 9/1990 | Toyoshima | |
| 5,151,896 A | | 9/1992 | Bowman et al. | |
| 5,311,515 A | | 5/1994 | Henderson et al. | |
| 5,568,484 A | | 10/1996 | Margis | |
| 5,689,229 A | * | 11/1997 | Chaco | G06F 19/327 340/286.07 |
| 5,903,227 A | * | 5/1999 | Scheuer | H04B 1/38 340/945 |
| 6,650,897 B2 | * | 11/2003 | Nelson | H04B 7/18506 455/431 |
| 9,015,775 B2 | * | 4/2015 | Perlman | H04N 7/24 725/74 |
| 9,185,433 B2 | * | 11/2015 | Margis | H04B 7/18508 |
| 2002/0082008 A1 | * | 6/2002 | Nelson | H04B 7/18506 455/431 |
| 2003/0055519 A1 | * | 3/2003 | Goldberg | G01S 5/0284 700/94 |
| 2003/0207694 A1 | * | 11/2003 | Legare | H04M 1/72513 455/511 |
| 2008/0104642 A1 | * | 5/2008 | Galipeau | H04N 7/10 725/76 |
| 2015/0128193 A1 | * | 5/2015 | Frisco | H04B 7/18508 725/76 |
| 2015/0227277 A1 | * | 8/2015 | Margis | B60N 2/4876 715/719 |

OTHER PUBLICATIONS

International Search Report for Application No. PCT/US95/16802 dated Mar. 8, 1996.

* cited by examiner

AUDIO SYSTEM FOR AN AIRCRAFT

CROSS-REFERENCE TO RELATED APPLICATION

This application claims the benefit of and priority to French patent application No. 15 51971 filed on Mar. 10, 2015, the entire disclosure of which is incorporated by reference herein.

TECHNICAL FIELD

The present disclosure relates to an audio system for an aircraft. Such an audio system equips aircraft in such a way as to allow the pilot, the crew, the ground mechanics, etc, to communicate with each other and with radio stations on the ground.

BACKGROUND

FIG. 1 shows an audio system of an aircraft according to the prior art. It comprises an audio management unit 10 to which are connected, on the one hand, pieces of audio equipment $12_1$ to $12_N$ (N=4 in this case) and, on the other hand, radiocommunications units 13, 14 and 15 in order to be able to communicate with stations on the ground by VHF, HF or by satellite (SATCOM) respectively. The pieces of audio equipment $12_i$ (i=1 to N, N=4 in this case) comprise audio units $12_{ia}$ for generating audio voice signals, the audio units being either a microphone $12_{1a}$, or headsets $12_{2a}$ provided with microphones, for example for the pilots, the crew or mechanics on the ground, oxygen masks $12_{3a}$, also provided with microphones, cabin handsets $12_{4a}$, etc. These audio units are connected to the audio management unit 10 by cables 11. Each piece of audio equipment 12 is moreover equipped with a control unit 12b ($12_{1b}$ to $12_{Nb}$, where N=4 in this case) generally appearing in the form of a press-to-talk button allowing an operator, such as a pilot, a co-pilot, a member of the cabin crew or a ground mechanic, to speak. Each control unit 12b is provided for generating a logic (on/off) control signal S which is conveyed, via a cable 16, to the audio management unit 10.

Thus, when an operator wishes to transmit a message by a piece of audio equipment 12, notably by his or her audio unit 12a, he operates the control unit 12b (if the control unit is a button, he presses the press to talk button 12b) of that piece of audio equipment 12. The logic control signal S generated by this operation is received by the audio management unit 10 and is retransmitted, via a selector 100, to the radiocommunications unit 13, 14 or 15 which has previously been selected by that operator, in connection with his audio equipment 12. On reception of the logic control signal S, the radiocommunications unit 13, 14 or 15 in question is activated and this happens as long as the logic control signal S is present, that is to say as long as the control unit 12b is being activated. The audio signals coming from the audio unit 12a of the audio equipment 12 are then conveyed via the management unit 10, in particular its selector 100, to the radiocommunications unit in question where they are transmitted by the latter.

FIG. 2 shows a timing diagram illustrating the operation of this audio system. The logic control signal S generated by the control unit 12b is at the 1 level when it is activated (the press to speak button is pressed) and at the 0 level in the opposite case. Also shown is the audio signal SA corresponding to the voice message that the operator sends whilst the radiocommunications unit is activated by the control signal S. This audio signal SA is transmitted from the audio unit 12a of the audio equipment 12 whose control unit 12b has be operated and directed to the radiocommunications unit previously selected in connection with that audio equipment 12.

The control unit 12b is generally a press-to-speak button also called "Push To Talk Switch" or "PTT Switch".

An aircraft is generally equipped with six radiocommunications units for the voice function (2 HF, 3 VHF and 1 SATCOM), with seven pieces of audio equipment 12 and therefore with seven speech control units 12b each with their own cable 16.

The disadvantage of these audio systems is the large number of cables routed from the cockpit to the avionics bay in the hold, definitively two per cockpit audio equipment.

There are also other audio systems where the logic control signals are transmitted by sending data frames on a communications bus via a specific communications protocol.

The disadvantage of these audio systems is their relative complexity.

A purpose of the present disclosure is to provide an audio system that does not have the disadvantages mentioned above and therefore whose number of cables is low in comparison with the system of the prior art which is not of low complexity.

In order to do this, the present disclosure relates to an audio system for an aircraft which comprises:
a management unit to which are connected, on the one hand, by cables, pieces of audio equipment and, on the other hand, at least one radiocommunications unit,
each audio equipment comprising an audio unit for generating audio signals and a control unit.

According to the present disclosure, it is characterized in that, on the one hand, each audio equipment comprises a generator which, under the control of the control unit, generates a pulsed coded audio signal and injects the signal into the same cable as that used for conveying the audio signals coming from the audio unit of the audio equipment, each code formed by a pulsed coded audio signal being representative of a piece of audio equipment, and in that, on the other hand, it comprises a decoder which, on reception of a coded audio signal generated by a piece of audio equipment, decodes it and generates a logic control signal in order to activate the radiocommunications unit which has previously been associated with the audio equipment represented by the code of the coded audio signal received and decoded.

BRIEF DESCRIPTION OF THE DRAWINGS

The features of the disclosure herein mentioned above, as well as others, will appear more clearly on reading the following description of an example embodiment, the description being given with reference to the appended drawings in which.

DETAILED DESCRIPTION

Figure 1:
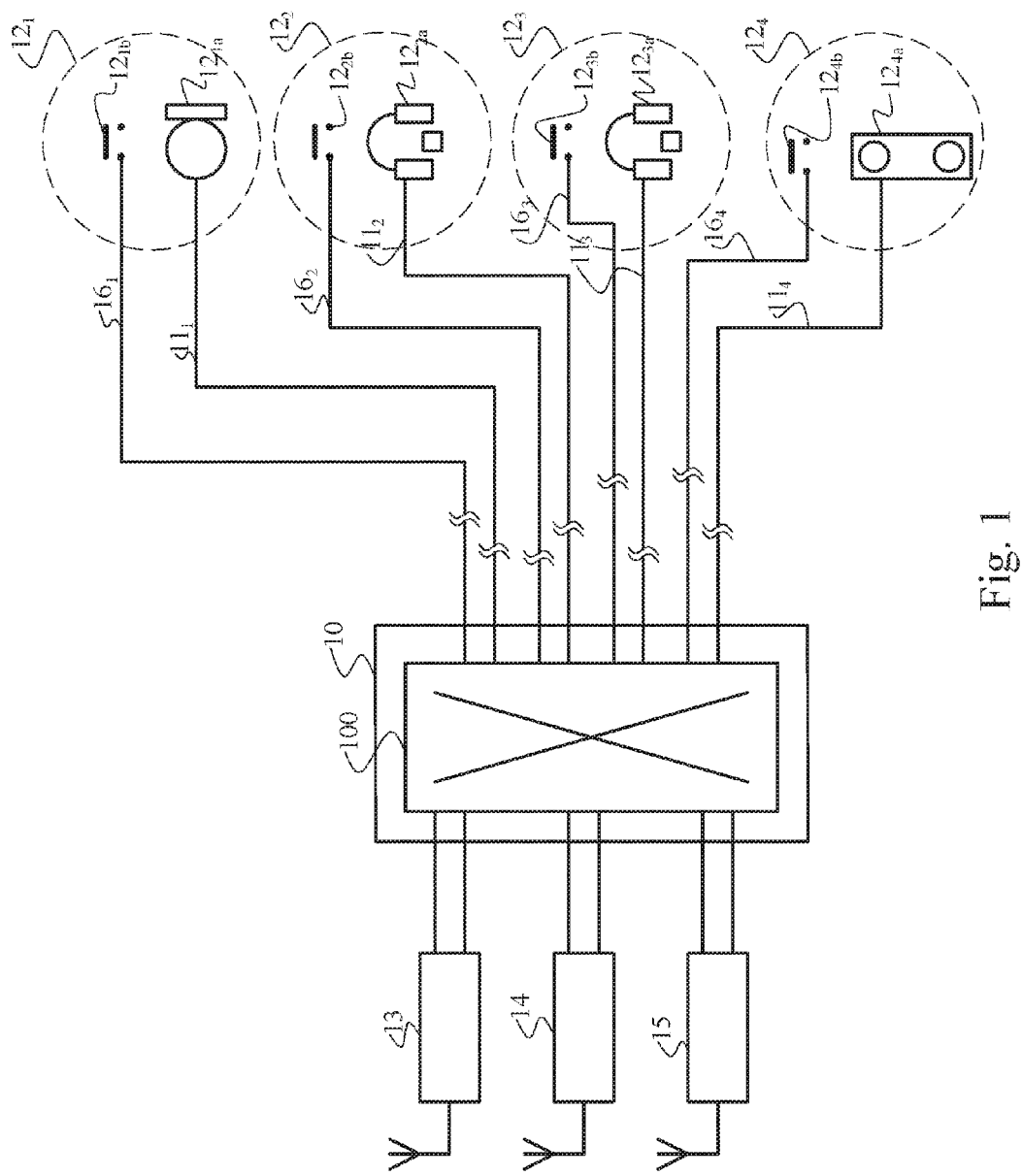
FIG. 1 is a block diagram of an audio system for an aircraft according to the prior art.
Figure 2:
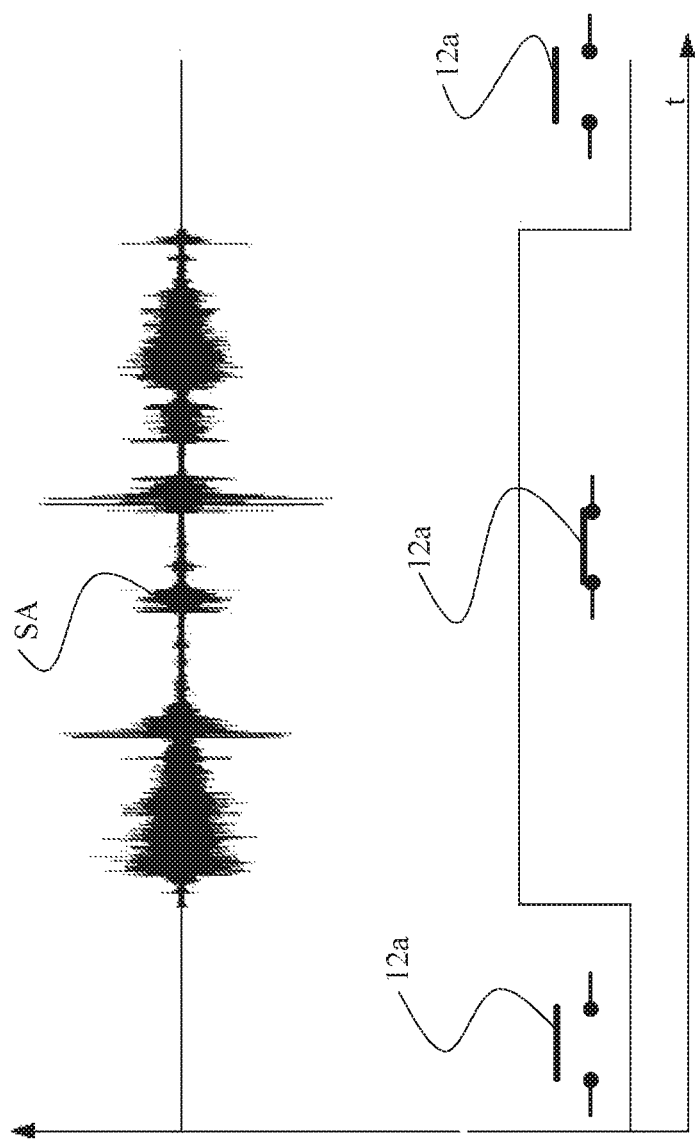
FIG. 2 is a timing diagram illustrating operation of an audio system for an aircraft according to the prior art.

An audio system for an aircraft according to the disclosure herein (shown in FIGS. 3a and 3b for first and second embodiments) comprises elements which are identical to those of the audio system of the prior art shown in FIG. 1. Thus, in FIGS. 3a and 3b, the same elements as those which have already been described with reference to FIG. 1 bear the same references and are not described again.

This audio system differs from the one described with reference to FIG. 1 by the pieces of audio equipment 12. Each audio equipment $12_i$ (where i=1 to N, N=4 in this case) comprises an audio unit $12_{ia}$ (such as a microphone $12_{1a}$, a headset $12_{2a}$, an oxygen mask $12_{3a}$, also provided with a microphone, cabin handsets $12_{4a}$, etc.) for generating audio signals which are conveyed to the management unit 10 by a cable $11_i$. It comprises moreover a control unit $12_{ib}$ (such as, for example, a push-to-talk button) and a generator $17_i$, which, under the control of the control unit $12_{ib}$ is provided for generating a pulsed coded audio signal and for injecting the signal into the same cable $11_i$ as the one used for conveying the audio signals generated by the audio unit $12_{ia}$ of the same audio equipment $12_i$.

Thus, when an operator operates the control unit 12b of a piece of audio equipment 12, the corresponding generator 17 generates a pulsed and coded audio signal which is injected into the cable 11 of the audio equipment 12 for its transmission to the management unit 10. When it releases the control unit 12b, the generator 17 also generates a pulsed and coded audio signal which is also injected into the cable 11 for its transmission to the management unit 10.

Figure 3A:
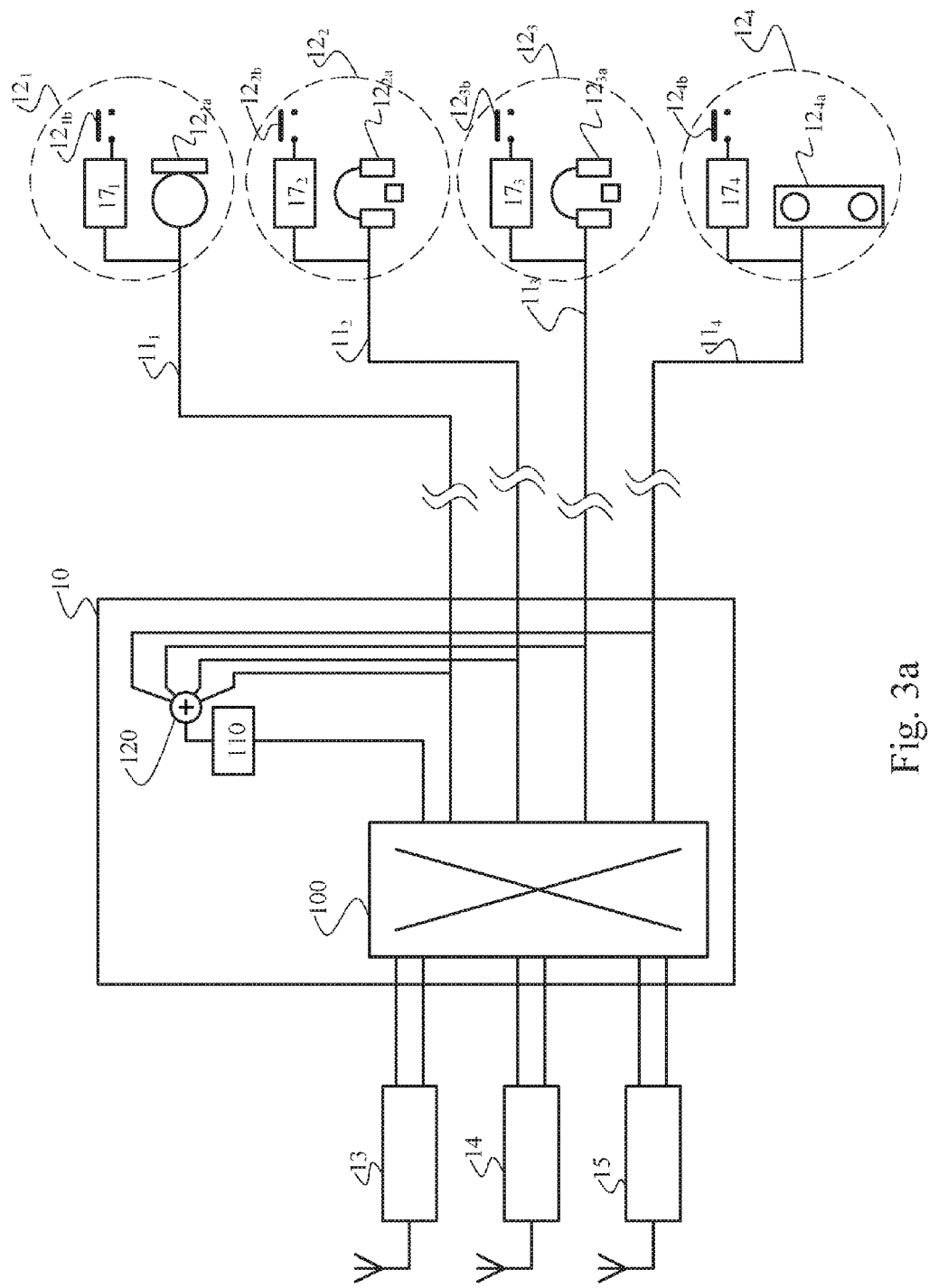
FIG. 3a is a block diagram of a first embodiment of an audio system for an aircraft according to the present disclosure.

In a first embodiment shown in FIG. 3a, the management unit 10 comprises an audio decoder 110 whose input is connected to the output of a summer 120 provided for receiving the audio signals present on all of the cables $11_1$ to $11_N$ (N=4 in this case). The decoder 110 is configured and provided for recognizing any pulsed and coded audio signal sent by the generators $17_i$ and for decoding them in order to generate on its output a logic control signal S which is then conveyed, via the selector 100, to the radiocommunications unit 13, 14 or 15 previously selected by the operator in order to activate it in connection with the audio equipment 12 whose generator 17 sent the pulsed and coded audio signal.

Figure 3B:
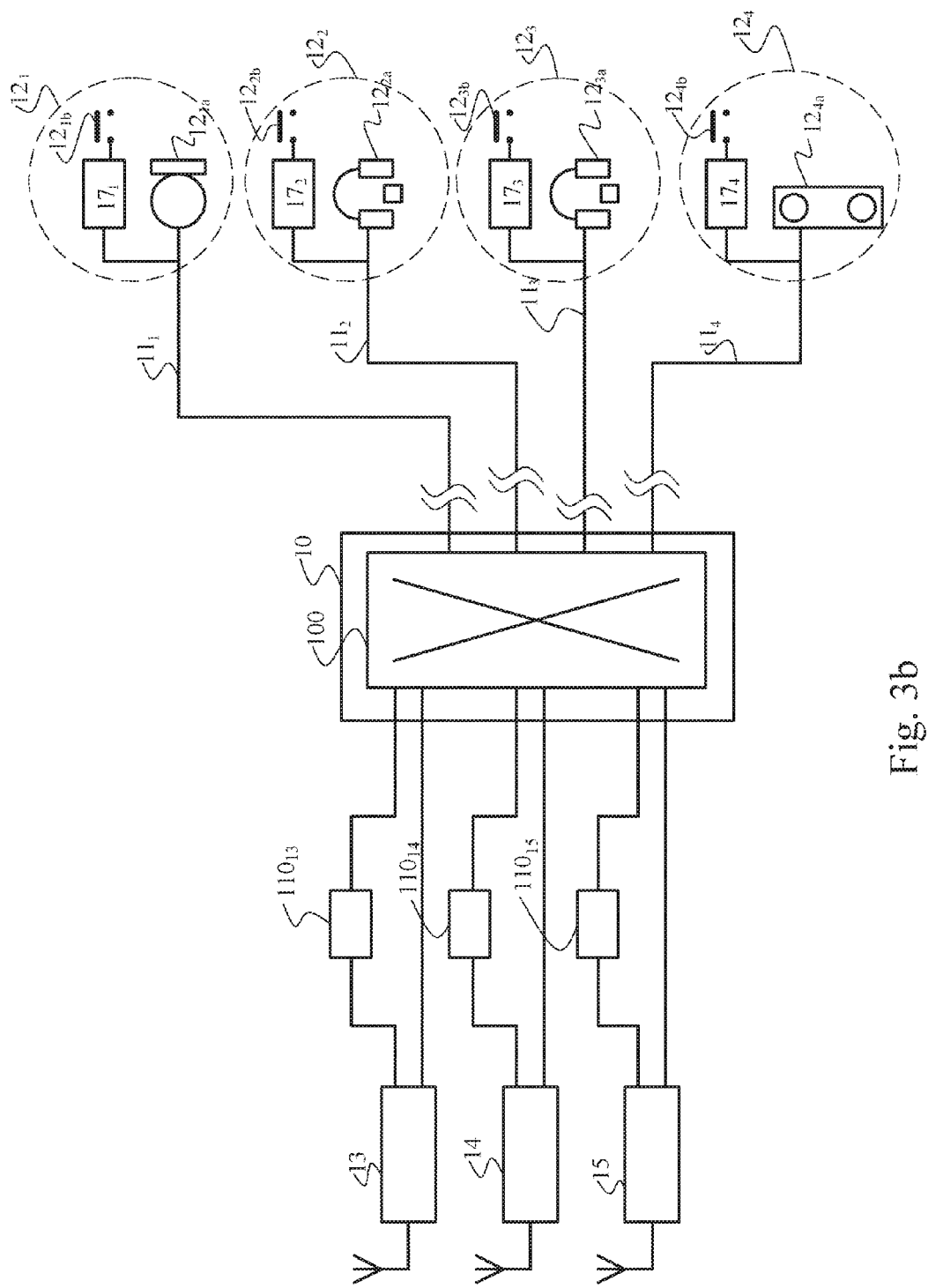
FIG. 3b is a block diagram of a second embodiment of an audio system for an aircraft according to the present disclosure.

In a second embodiment shown in FIG. 3b, associated with each radiocommunications unit 13, 14 or 15, there is provided a decoder $100_{13}$, $100_{14}$ or $100_{15}$ which is configured for and receives the audio signal conveyed, via the selector 100, to the radiocommunications unit 13, 14 or 15 corresponding to the one which was previously selected by the operator, which recognizes and decodes the pulsed and coded audio signal sent by the generator $17_i$ and then delivers a logic control signal S to that radiocommunications unit 13, 14 or 15.

Figure 4:
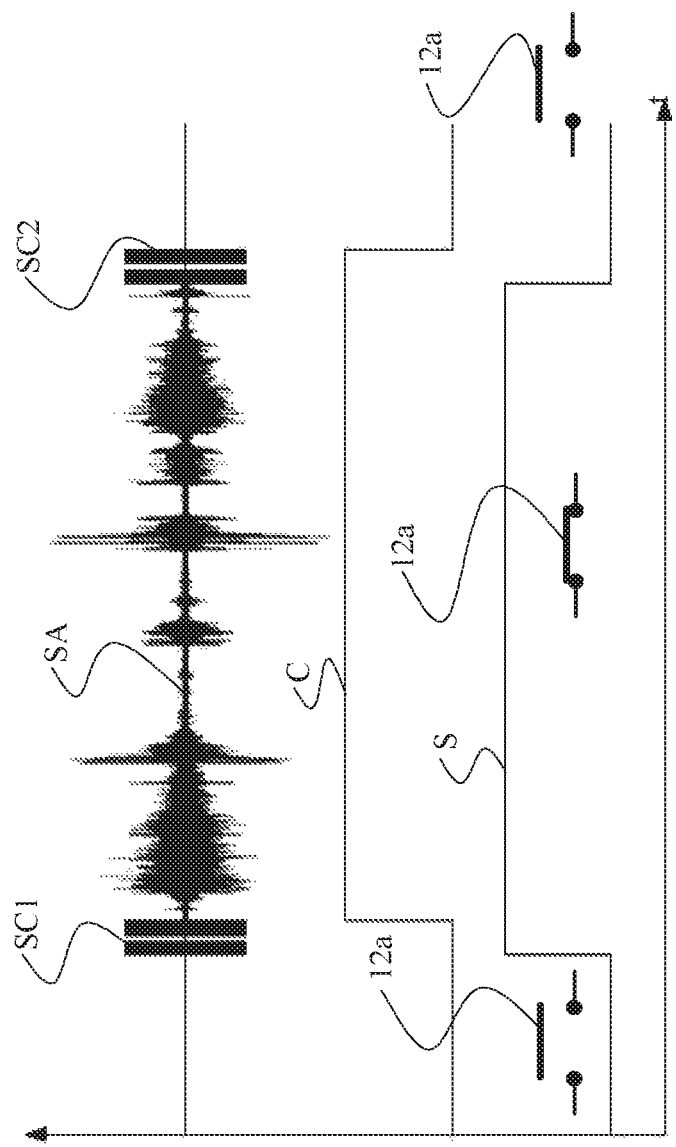
FIG. 4 is a timing diagram illustrating operation of an audio system for an aircraft according to the present disclosure.

FIG. 4 shows a timing diagram illustrating the operation of an audio system according to the disclosure herein. When the control unit 12b is operated (the push-to-talk button 12b of a piece of audio equipment 12 is pressed), it generates a signal C which changes from a 0 level to a 1 level in order to control the corresponding generator 17. This generator 17 generates a coded audio signal SC1 which is injected into the cable 11 as an audio signal (top diagram), that is to say one whose frequency spectrum is essentially within the band of audible frequencies. On receiving it, the decoder 110 decodes it and generates a logic control signal S which is transmitted, via the selector 100, to the radiocommunications unit in question 13, 14 or 15 previously selected by the operator for connecting with the audio equipment 12 which sent the coded audio signal SC1. The change from the 0 level to the 1 level of the logic control signal S is consecutive to the sending of the coded audio signal SC1. There has also been shown the audio signal SA corresponding to the message that the operator transmits whilst the radiocommunications unit is activated by the logic control signal S. When the operator releases the activation of the control unit 12b (the push-to-talk button 12a is released) (the control signal C changes from the 1 level to the 0 level), the generator 17 generates a coded audio signal SC2 which is injected into the cable 11 as an audio signal. When it is received, the decoder 110 decodes it and the logic control signal S changes from the 0 level to the 1 level, thus deactivating the radiocommunications unit which was connected with the audio equipment 12 which sent the coded audio signal SC2.

In a particular embodiment, a pulsed audio signal is constituted by a plurality of fundamental audio signals of given frequencies from among a set of different frequencies (also called "tones") sent over a predetermined duration. "Fundamental audio signal" refers to a signal having a simple waveform (for example, sinusoidal, square, triangular, sawtooth, etc.) whose fundamental frequency is within the audible frequencies band.

For example, a fundamental audio signal of given frequency is representative of a symbol belonging to an alphabet. A combination of fundamental audio signals of different frequencies is formed by being constituted by several fundamental audio signals transmitted simultaneously. A combination is representative of a word formed by several symbols. A pulsed coded audio signal is for example constituted by a sequence of M combinations, different or not, of a number N of fundamental audio signals having different frequencies (also called "tones") emitted simultaneously over a predetermined duration. This sequence is representative of a code, constituted therefore of M words of N symbols. According to the disclosure herein, a code corresponds to a specified piece of audio equipment and, more precisely, to a particular action of a specified piece of audio equipment.

For example, the alphabet in question can be constituted by the first sixteen letters A to S as symbols and the corresponding frequencies of the fundamental audio signals are given in the following table.

| | |
|---|---|
| A | 312.6 Hz |
| B | 346.7 Hz |
| C | 384.6 Hz |
| D | 426.6 Hz |
| E | 473.2 Hz |
| F | 524.8 Hz |
| G | 582.1 Hz |
| H | 645.7 Hz |
| J | 716.1 Hz |
| K | 794.3 Hz |
| L | 881.0 Hz |
| M | 977.2 Hz |
| P | 1083.9 Hz |
| Q | 1202.3 Hz |
| R | 1333.5 Hz |
| S | 1479.1 Hz |

These frequencies are those which are defined in the ARINC 714 standard of ARINC (Aeronautical Radio Incorporated) with regard to the selective calling system called SELCAL (the acronym for Selective Calling).

The number N of fundamental audio signals per combination is for example two (N=2) and a sequence is constituted by two combinations (M=2). The words formed are therefore of two symbols or letters and the codes of two words, that is to say four symbols.

For example, the code corresponding to the pulsed coded audio signal sent when the pilot operates the control unit $12_{1b}$ of his audio equipment $12_1$ is AB-AC (simultaneous transmissions of the frequencies 312.6 Hz and 346.7 Hz, then of the frequencies 312.6 Hz and 384.6 Hz) and, when he releases it, it is AC-AB (simultaneous transmissions of the frequencies 312.6 Hz and 384.6 Hz, then of the frequencies 312.6 Hz and 346.7 Hz). Similarly, when an operator operates the control unit $12_{2b}$ of his audio equipment $12_2$, the word transmitted is for example AD-AE and, when he releases it, AE-AD.

Figure 5:
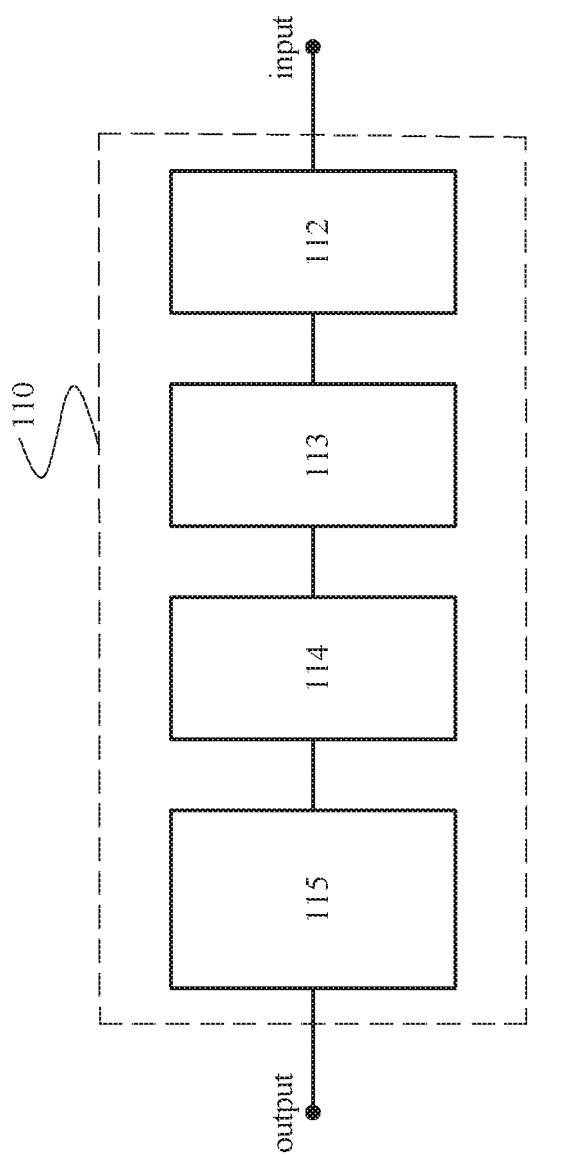
FIG. 5 is a block diagram of a decoder of an audio system for an aircraft according to the present disclosure.

FIG. 5 shows a block diagram of a decoder 110. The decoder 110 comprises a filter 112, for example of the band pass type passing the frequencies used for the selection (in the example given above 312.6 Hz-1479.1 Hz) in order to eliminate audio signals outside of these frequencies, notably voice audio signals. It also comprises a tone detector 113 which identifies in the pulsed coded audio signals the frequencies used for the selection and delivers the decoded code (for example AB-AC). It also comprises an acceptance module 114 which checks that the decoded word conforms with the construction rules of the codes (for example AB-CD has no meaning if a rule stipulates that a common symbol must occur in each combination of a sequence). Finally, it comprises a decoding module 115 which transmits an activation control signal S as a function of the decoded code. For example, if the decoded code is AB-AC (corresponding to the audio equipment $12_1$ of the pilot) the decoder transmits an activation control signal S for the radiocommunications unit 13, 14 or 15 which had previously been selected by the operator and, because of this, associated with a piece of audio equipment 12 (in this case, the audio equipment 12 of the pilot). This audio equipment 12 is the one which corresponds to the decoded code.

One embodiment of a decoder according to the disclosure herein is to use a selective calling system defined in the ARINC 714 of the SELCAL type already present in the audio management unit AMU (Audio Management Unit). However, this SELCAL system will have to be modified.

The duration of transmission of each combination of fundamental audio signals must be short in order not to interfere with the voice message. For example, a duration which is less than one second by at least one order of magnitude (that is to say by at least a factor of 10), that is to say less than 100 ms, for example of the order of 50 ms, can be provided (the duration defined in the ARINC 714 is of the order of 1 second). The tone detector 113 must therefore be able to identify pulsed and coded audio signals of shorter duration.

The codes transmitted by the pulsed coded audio signals generators must not be interpreted as valid SELCAL codes. A SELCAL code is valid if it does not comprise the same symbols twice (a symbol corresponding to a frequency) such as: BD-AF, AC-EF. According to the present disclosure, the codes used comprise the same symbol in each combination of the same sequence, for example AB-AC, AC-AB, etc. Thus, these invalid SELCAL codes cannot therefore ever be decoded by the SELCAL decoders. This also makes it possible to ensure that there are no untimely triggerings of the decoder.

In an alternative embodiment, it is a combination of sinusoidal signals of different frequencies which constitutes a signal, a sequence of combinations forming a word and therefore the code. An example of such coding is the coding known as "DTMF" (Dual Tone Multi-Frequency).

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. An audio system for an aircraft, comprising:
   a management unit to which are connected, by cables, at least one piece of audio equipment and at least one radiocommunications unit;
   each piece of audio equipment comprising an audio unit for generating audio signals and a control unit;
   wherein each piece of audio equipment comprises a generator which, under control of the control unit, is configured to generate a pulsed coded audio signal and to inject the signal into a same cable as that used for conveying the audio signals coming from the audio unit of the audio equipment, each code formed by a pulsed coded audio signal being representative of a piece of audio equipment; and
   wherein the audio system comprises a decoder which, on reception of a coded audio signal generated by a piece of audio equipment, is configured to decode the coded audio signal and generate a logic control signal to activate the radiocommunications unit which has previously been associated with the audio equipment represented by the code of the coded audio signal received and decoded.

2. The audio system as claimed in claim 1, wherein a pulsed coded audio signal is constituted by at least one fundamental audio signal of predetermined frequency from among a set of different frequencies transmitted over a predetermined duration.

3. The audio system as claimed in claim 1, wherein a pulsed coded audio signal is constituted by a sequence of several combinations of a number of fundamental audio signals of different frequencies transmitted simultaneously for each combination over a predetermined duration.

4. The audio system as claimed in claim 3, wherein each fundamental audio signal corresponds to a symbol belonging to an alphabet, and each combination of fundamental audio signals corresponds to a word and each sequence of combinations of fundamental audio signals corresponds to a code word, each code word corresponding to a specified piece of audio equipment or to a particular action of a specified piece of audio equipment.

5. The audio system as claimed in claim 3, wherein a pulsed coded audio signal comprises a sequence of two combinations of two fundamental audio signals having different frequencies transmitted simultaneously for each combination over a predetermined duration.

6. The audio system as claimed in claim 5, wherein the decoder is a selective calling system and a code word corresponding to a specified piece of audio equipment or to a particular action of a piece of audio equipment comprises a same symbol in each combination of the same sequence forming the code word.

7. The audio system as claimed in claim 3, wherein each combination of fundamental audio signals corresponds to a symbol belonging to an alphabet and in that each sequence of combinations of fundamental audio signals corresponds to a code word, each code word corresponding to a specified piece of audio equipment or to a particular action of a specified piece of audio equipment.

8. The audio system as claimed in claim 1, wherein a duration of the pulsed coded audio signals is less than 100 ms.

9. The audio system as claimed in claim 1, wherein the management unit comprises the decoder.

10. The audio system as claimed in claim 1, comprising a plurality of decoders each associated with a respective radiocommunications unit of a plurality of radiocommunications units.

* * * * *